May 27, 1924.                    1,495,618
J. STREDA
PIPE WRENCH
Filed Dec. 4, 1922          2 Sheets-Sheet 1
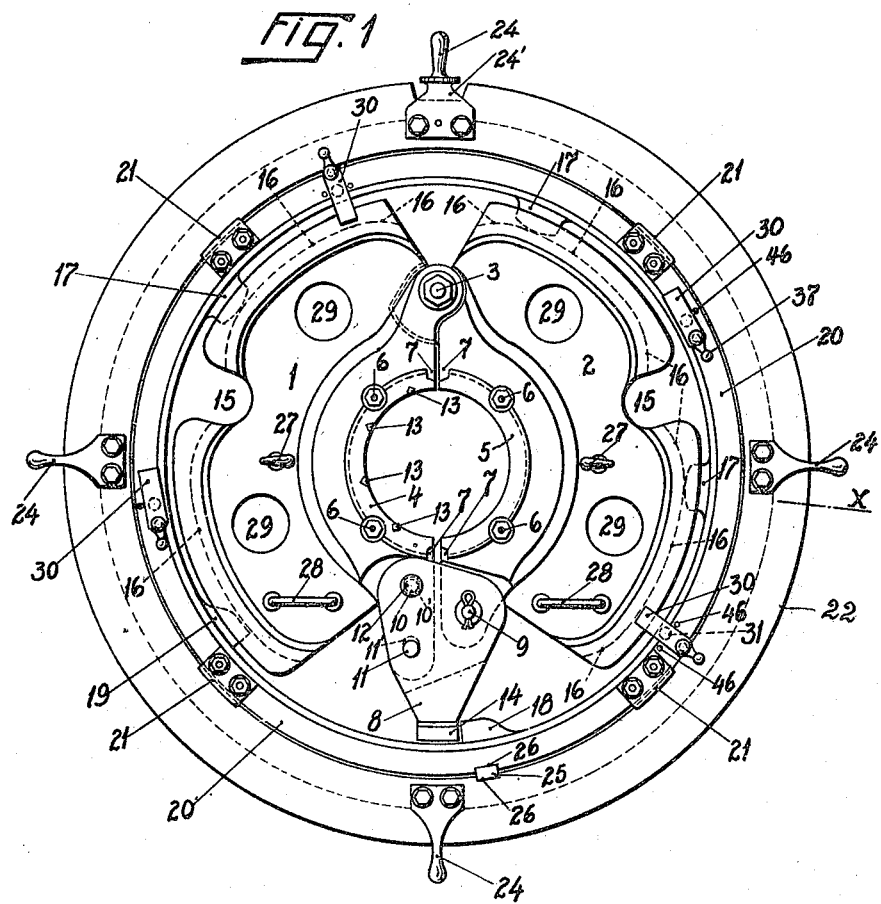
Fig. 1
Fig. 4
Fig. 5
Fig. 6
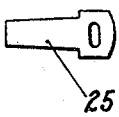
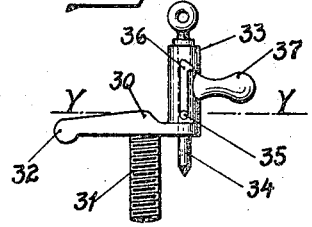
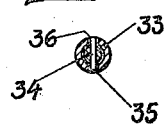
Inventor:
Joseph Streda

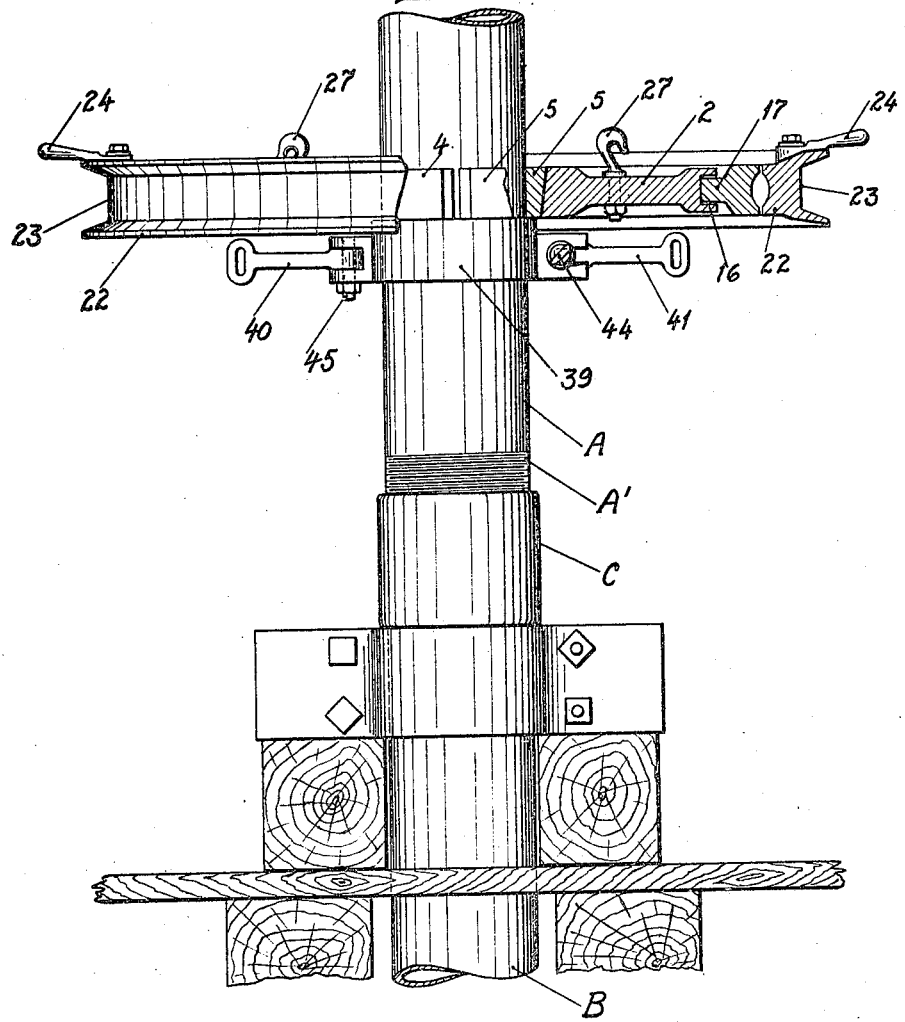

Patented May 27, 1924.

1,495,618

UNITED STATES PATENT OFFICE.

JOSEPH STREDA, OF LONDON, ENGLAND.

PIPE WRENCH.

Application filed December 4, 1922. Serial No. 604,945.

*To all whom it may concern:*

Be it known that I, JOSEPH STREDA, a citizen of the Czechoslovakian Republic, residing at London, England, have invented certain Improvements in Pipe Wrenches, of which the following is a specification.

This invention relates to a pipe wrench particularly for use in connection with the boring of petroleum wells, its object being to produce easily manipulated means whereby the pipes can be connected and disconnected by mechanical power in a short space of time and without incurring any damage to the pipes.

This object is achieved according to the invention by the provision of two jaws which are hingedly connected to one another and to an operating lever and which can be rotated by means of a surrounding ring adapted for this purpose to cooperate with the lever, the outer rim of the ring being adapted for independent rotation for the convenient winding thereon of a traction cable whereby the connection and disconnection of the pipes are performed.

Fig. 1 of the drawings represents a plan of the complete apparatus, and

Fig. 2, a side view of the same partly in section on the line X of Fig. 1.

Fig. 3 is a plan of a clamp for supporting the apparatus on the pipe,

Fig. 4, a view of a wedge for connecting the ring parts,

Fig. 5, a view of an adjustable bracket for supporting the ring parts on the jaws, and Fig. 6, a cross-section on the line Y—Y of Fig. 5.

The device is composed of two jaws 1 and 2 which are hinged together at 3 and which are formed with exchangeable gripping members 4 and 5 whereby they can be adapted for use with different sizes of pipes. The bearing surfaces of the jaws and gripping members are conical, and the latter are forced down between projections 7 in the jaws by means of screws 6 so that a rigid connection of the elements is obtained. One of the gripping members has square steel studs 13 inserted so as to project slightly from the gripping surface for engagement with the pipes. The free ends of the jaws are hingedly connected to an operating lever 8, the jaw 2 by means of a bolt 9 and a split pin, and the jaw 1 by means of a bolt 12. For the latter bolt there are two apertures 10 and 11 in the lever 8 and two, slightly elongated apertures 10' and 11' in the jaw 1. These apertures are so arranged relative to the bolt 9 that a different effect on the jaws is produced by the connection of the bolt 12 to one set or the other. With the bolt in the apertures 10, 10', as shown in the drawings, the jaws will be clamped to the pipes by a right-hand pressure on the outer end 14 of the lever 8 and released therefrom by a left-hand pressure. The effect will be reversed if the bolt is applied to the apertures 11, 11'. The jaws are fitted with hooks 27, for suspension on hoisting cables, and also with handles 28 for facilitating their manipulation. They may be lightened by being formed with apertures 29.

For rotating the jaws and the pipes, a ring 20 is provided which is furnished with inwardly projecting radial lugs 17, 18 and 19. For engagement with these lugs, the outer edges of the jaws are fitted with grooved lips 16. The lugs enter the grooves of the lips from spaces formed between the ends of the jaws and from spaces 15 formed midway between the ends. The ring can also be supported on the lips by means of brackets 30, the construction of which is more clearly illustrated in Fig. 5. Each bracket is secured to the ring 20 by means of a screw-bolt 31 to which it is swivelled so that it can be set either radially or tangentially to the ring 20. To secure the bracket in either position, a locking pin 34 is provided which is slidably guided in a socket 33 mounted on the bracket. A cross-pin 35 in the pin 34 engages a slot 36 at the upper end of which it can be retained for holding the locking pin in a retracted position. There are apertures 46 in the ring 20 with which the locking pins 34 can be engaged for securing the brackets either in the radial position in which they can support the ring 20 on the lips 16 of the jaws, or in the tangential position in which they are out of engagement with the jaws.

The ring 20 has a loose rim 22 which is held between radial plates 21 so that it can be rotated independently of the main body of the ring. The rim is normally locked to the body by means of a wedge 25 which is accommodated in notches 26 between the two elements. For the manipulation of the rim, the latter is provided with radial handles 24. A circumferential groove 23 is formed in the rim 22 for the accommodation of a cable which is connected, for the operation of the device, to some kind of hoist or traction machine. The near end of the cable may be secured to a neck 24' formed on one of the handles 24.

For supporting the wrench on an upright pipe, the clamp shown in Fig. 3 may be provided. This clamp is composed of two semicircular clamping members 38 and 39 which are hinged together at 45. The member 38 is formed with two handles 40 and 41, and the free end of the member 39 has a forked lug for engagement with a bolt 42. The latter is pivoted at 43 to the handle 41 and is fitted with a nut 44 whereby the two members can be clamped to a pipe embraced by the same.

The modus operandi is as follows:—

One of the pipes B is rigidly secured in any suitable known manner. Before placing the second pipe A in connecting position, the ring 20 is preferably arranged about the end of the pipe B which in the present instance is held in a vertical position. Then the second pipe A is centered in the end of the socket C, and the clamp 38, 39 is applied to the same so that it can be used for the initial turning of the pipe which is required for starting the screw-thread A' properly in the socket C. The clamp can now be shifted, if necessary, to the position in which the wrench is to be supported on the pipe A. The jaws of the wrench, fitted with appropriate gripping members and suspended, if so required, on hoisting cables connected to the hooks 27, are then applied to the pipe just above the clamp, and the lever 8 is connected to the jaw 1 by the insertion of the bolt 12 in the apertures 10, 10'. The hoisting cables are now applied to the ring 20 whose brackets 30 are set in the tangential position, and the ring is lifted into register with the jaws, the lugs 18 and 19 being admitted at opposite sides of the lever 8 and the other lugs through their allotted spaces. When the brackets 30 are above the top surface of the jaws, they are turned into their radial position whereupon the hoisting cables can be slackened and removed since the ring will now be supported on the jaws by means of the brackets. Then the ring is turned clock-wise so that the lugs 17, 19 enter the grooves of the lips 16 and so that the free end 14 of the lever 8 is engaged by the lug 18 for applying the jaws to the pipe. The traction cable is next attached to the handle neck 24', and the wedge 25 is removed so that the rim 22 can be turned anti-clockwise for winding the cable onto it. After the completion of the winding, the wedge 25 is replaced in its locking position between the ring parts, whereupon the pipe can be screwed home by means of the traction cable. If, during the operation, it should for any reason be necessary to turn the pipe back, this can be effected by merely shifting the bolt 12 from the apertures 10, 10' to the apertures 11, 11' and rewinding the cable in the opposite direction. The lever 8 will then be engaged by the lug 19 and the pipe will be unscrewed.

When the device is to be dismounted, the brackets 30 are set in the tangential position, and the ring turned so as to disengage the lugs from the lips 16.

I claim:—

1. A pipe wrench comprising two hingedly connected jaws, an operating lever hinged to the free ends of the jaws so that it can be used for rotating the jaws and clamping them to the pipe, a driving ring surrounding the jaws and rotatably guided thereon, means for engaging the ring operatively to the lever, a rim loosely arranged about said ring so that it can be turned independently for winding thereon a traction cable, and means for securing the rim to the ring so that the cable can be used for driving the wrench.

2. A pipe wrench comprising two hingedly connected jaws, an operating lever connected by hinge pins to the free ends of the jaws so that it can be used for rotating the jaws and clamping them to the pipe, means for producing clamping effect in either direction of movement by a change of position of one of the hinge pins, a driving ring surrounding the jaws and guided rotatably thereon, radial lugs arranged on said ring so as to enter into operative engagement with the lever when the ring is turned in either direction, and means for winding a traction cable on the ring for driving the wrench.

3. A pipe wrench comprising two hingedly connected jaws, an operating lever connected by hinge pins to the free ends of the jaws so that it can be used for rotating the jaws and clamping them to the pipe, means for producing clamping effect in either direction of movement by a change of position of one of the hinge pins, grooved lips formed at the outer edges of the jaws, a driving ring having internal radial lugs whereby it is rotatably guided in the grooves of said lips, two of said lugs being adapted to enter into operative engagement with said lever for driving the jaws in either direction, and means for winding a traction cable on the ring for driving the latter.

4. A pipe wrench comprising two hingedly connected jaws, an operating lever connected by hinge pins to the free ends of the jaws so that it can be used for rotating the jaws and clamping them to the pipe, means for producing clamping effect in either direction of movement by a change of position of one of the hinge pins, grooved lips formed at the outer edges of the jaws, a driving ring adapted to be admitted axially into the plane of the jaws, internal radial lugs on said ring adapted to enter the grooves of the lips so as to support the ring rotatively on the jaws, two of said lugs being adapted to enter into operative engagement with said lever for driving the wrench in either direction, brackets connected to said ring so that they can be set either radially for supporting the ring on the jaws when the lugs are out of engagement with the lips, or tangentially for releasing the ring from the jaws, and means for winding a traction cable on the ring for driving the latter.

5. A pipe wrench comprising two hingedly connected jaws, an operating lever connected by hinge pins to the free end of the jaws so that it can be used for rotating the jaws and clamping them to the pipe, means for producing clamping effect in either direction of movement by a change of position of one of the hinge pins, a driving ring guided rotatably on said jaws, internal radial lugs on said ring forming abutments for operative engagement with said lever, a rim loosely arranged about said ring so that it can be turned independently for winding thereon a traction cable, and means for securing the rim to the ring so that the cable can be used for driving the wrench.

6. A pipe wrench comprising two hingedly connected jaws, an operating lever connected by hinge pins to the free ends of the jaws so that it can be used for rotating the jaws and clamping them to the pipe, means for producing clamping effect in either direction of movement by a change of position of one of the hings pins, a driving ring guided rotatably on said jaws, internal radial lugs on said ring forming abutments for operative engagement with said lever, a rim loosely arranged about said ring and formed with a groove for accommodating a traction cable, handles connected to the rim so that it can be turned for winding the cable thereon, one handle being formed with a neck for attachment to the end of the cable, and means for securing the rim to the ring so that the cable can be used for driving the wrench.

JOSEPH STREDA.